May 2, 1967 — J. F. LOPRETE — 3,316,719
EXPANSIBLE ROCKET ENGINES
Filed March 11, 1965 — 2 Sheets-Sheet 1

INVENTOR.
JOSEPH F. LOPRETE
BY Raymond P. Wallace
AGENT

May 2, 1967 J. F. LOPRETE 3,316,719
EXPANSIBLE ROCKET ENGINES
Filed March 11, 1965 2 Sheets-Sheet 2

INVENTOR.
JOSEPH F. LOPRETE
BY Raymond P. Wallace
AGENT

United States Patent Office 3,316,719
Patented May 2, 1967

3,316,719
EXPANSIBLE ROCKET ENGINES
Joseph F. Loprete, Wayne, N.J., assignor to Curtiss-Wright Corporation, a corporation of Delaware
Filed Mar. 11, 1965, Ser. No. 438,943
5 Claims. (Cl. 60—256)

This invention relates to reaction engines for intermittent thrust, and particularly to a reaction device and fuel supply capable of providing thrust in discrete increments of standard impulse, either singly or in bursts of selected number.

Such a device is especially useful on a vehicle in space for altering the velocity of the vehicle either additively or subtractively when the thrust is exerted on the vehicle along the line of motion either in the direction of travel or opposite thereto; or to alter the orientation of the axes of the vehicle by exerting thrust transversely to the axis to be altered, at a location spaced from the center of mass. The invention may also be employed to impart spin to the vehicle about one of its axes, or for orientation of equipment such as camera, solar panels, directional antennas, etc.

The present invention is an improvement over that disclosed in the copending application of George Kraus, Ser. No. 247,672 filed Dec. 27, 1962, entitled, Attitude Control Device for Space Vehicles, which application is owned by the assignee of the present invention. In the Kraus application there is disclosed a concatenated series of small individual rocket engines bonded to a flexible feeding member, each engine comprising a housing having a firing chamber and thrust nozzle and containing a propellant charge having electrical igniting means; and automatic means for transporting the engine serially from a magazine to a firing position and for firing any selected number, each engine producing a standard power impulse from ignition to burn-out.

In the prior art device of Kraus, the housing of each engine was formed of rigid material, which had to be strong enough to withstand the firing pressure during combustion of the propellant. The housing was therefore large and heavy in relation to the thrust obtained from each propellant charge, requiring considerable storage space in the magazine for the fresh engines, and adding to the burden of weight which must be lifted on take-off.

The present invention overcomes this prior art disadvantage by providing a concatenated series of encapsulated rocket engines in which the housing of each engine is formed of a thin, lightweight elastomer closely fitting the original dimensions of the propellant charge, and capable of expanding under combustion pressure, and by providing the transporting and positioning means with suitable chambers mating serially with each engine, which chambers confine and limit the expansion of the elastomeric housing and contain the pressure. Thus, the unfired engines in their original collapsed state not only require less storage space but are lighter in weight than in the prior art device.

It is therefore an object of this invention to provide a means of applying thrust to a vehicle.

It is another object of the invention to provide means adapted to fine or gross orientation of a vehicle or equipment.

A further object is to provide means of applying thrust in discrete reaction impulses.

Still another object is to provide a concatenated series of individual rocket engines, each bearing a fuel charge and having a lightweight expandable housing.

A still further object is to provide a transport and firing system for such a concatenated series of engines, having means for limiting and supporting the expansion of such housings.

Other objects and advantages will become apparent on reading the following specification in connection with the accompanying drawings, in which FIG. 1 is a view partly in cross-section of one of the individual rocket engines and a portion of the feeding tape, taken on line 1—1 of FIG. 2;

Figure 1:
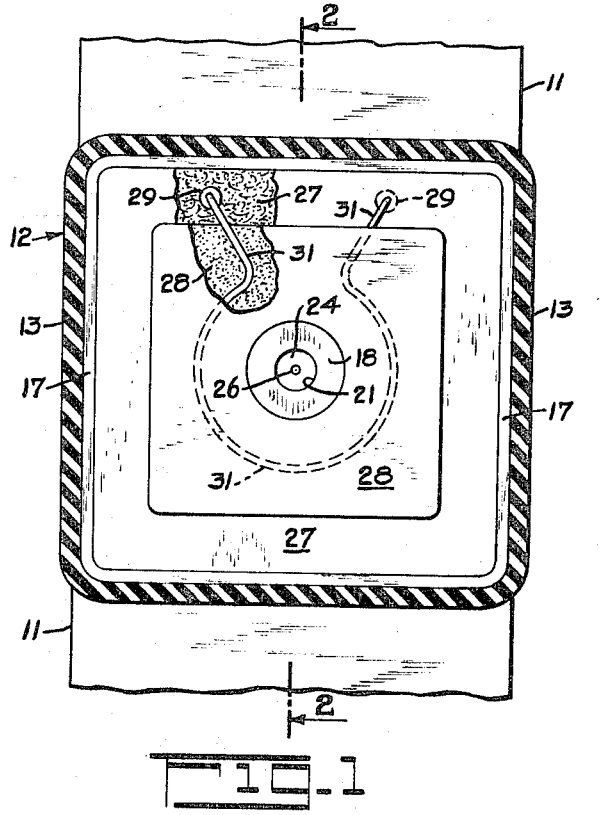
Figure 2:
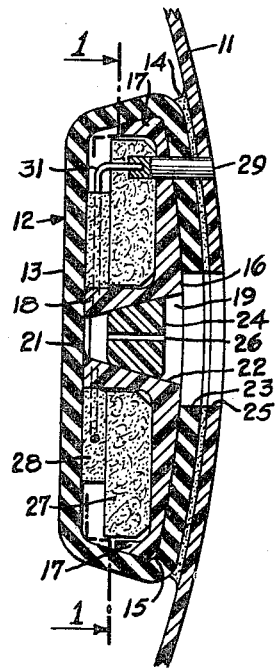
FIG. 2 is a cross-section of one of the rocket engines and a portion of the tape, taken on line 2—2 of FIG. 1.

In FIGS. 1 and 2 there is shown a portion of a strip of flexible tape 11 having bonded thereto a reaction motor or rocket engine 12 as one of a concatenated series of such engines. Any material of suitable strength may be used for the tape, such as the polyethylene terephthalate resin sold under the trademark "Mylar," or phenolic plastic reinforced with glass fiber. A particularly satisfactory material is a polytetrafluorethylene polymer, such as sold under the trademark "Teflon," reinforced with glass fiber.

An elastomeric casing or housing member 13 for the engine 12 is bonded at 14 to the flexible tape or ribbon 11. The housing may be formed of rubber, neoprene, silicone rubber, polyurethane, or similar elastomers, and epoxy resins form satisfactory adhesives. The tape 11 and the bonding agent 14 are shown in exaggerated thickness for clarity in the drawing.

Positioned within the housing is a charge-carrier 16 formed of plastic, Bakelite, lightweight metal, or the like. In the embodiment depicted the housing and the charge-carrier are shown as generally square in outline, but they may also be of some other convenient shape, such as circular. Carrier 16 is formed as a plate-like element on which the propellant charge is positioned, and bears the exhaust nozzle of the engine. As shown it is a shallow receptacle or pan having low sidewalls 17. The principal function of the sidewalls is to provide convenient definition for the periphery of the charge to be molded or otherwise deposited on the carrier, and to provide a slightly curved configuration at the external peripheral edge 15 of the carrier where the housing wraps around, so that the material of the housing will not have too sharp an angle where it is bonded to the tape, with consequent stress areas developing when it expands under combustion pressure. However, if desired the carrier 16 may also be formed as a plate member without side walls. Both the major surfaces of the carrier may be flat, or the surface disposed facing the tape 11, opposite to the charge, may be curved as shown to mate conveniently wtih the apparatus in which it is to be used.

A re-entrant, generally tubular member or center post 18 extends from the center of the charge side of the carrier. The exterior surface of the center post is conveniently made cylindrical in form, but may be square or hexagonal or of other desired shape. The wall of the center post defines a thrust nozzle 19 extending through the interior of the post and the plate portion of the carrier. Nozzle 19 has a throat portion 21 in the free end or upstream end of the center post and a diverging portion 22 extending downstream through the post and the plate portion. During combustion the nozzle serves in combination with the elastomeric housing chamber as a converging-diverging rocket nozzle, discharging through apertures 23 in the housing and 25 in the tape, the latter apertures being generally coaxial with the nozzle.

Until the time of firing the engine, the nozzle 19 may have its diverging portion or orifice 22 occluded by a closure member such as a frusto-conical plug 24 of plastic or the like, pressed into the diverging portion of the nozzle and retained by friction or cement of low adhesive power and having a small aperture 26 therethrough to allow air within the engine to bleed out when transported into a low pressure environment. The function of the closure 24 is to provide more efficient operation of the engine, by causing a certain preliminary build-up of gas pressure within the housing at the beginning of combustion, which will dislodge the plug at some preselected pressure, the press-fit of the plug into the nozzle having been controlled to allow it to blow out at the desired pressure value. The blowout pressure selected will of course depend on the size of a given engine, the amount and kind of propellant, and the effect desired. In one embodiment the material of the elastomeric housing has been chosen to expand at 25 p.s.i., and blowout pressure for the plug at 200 p.s.i. The aperture 26 through the plug communicating with the interior of the engine is of very small cross-section, only sufficient to allow bleeding of entrapped air, and is not large enough to permit substantial leakage of pressure at the beginning of combustion before blowout pressure is reached. Plug 24 may also be made of spongy or porous material, to allow bleeding without an aperture.

A flat cake of solid fuel propellant 27 is positioned on the surface of the carrier 16, surrounding the center post and within the side walls in embodiments where such side walls are present. The propellant 27 may be of any suitable explosive material or rocket fuel, the choice of which may vary widely according to the desired burning characteristics, such as the temperature of ignition, burning rate, and thrust or pressure developed, for example. One composition which has been successfully used comprises a mixture of potassium perchlorate and rubber, which is readily moldable into suitable form and possesses the necessary storage life in a low pressure or space environment.

A flame propagating layer of a pyrotechnic or similar material 28 ignitable at a lower temperature than the main propellant may be positioned on the surface of charge 27, for easy ignition and rapid flame propagation, so that a large surface of charge 27 is ignited substantially instantaneously. If such a flame propagator is used it forms a part of the fuel or propellant charge of the engine, its combustion gases being exhausted through the nozzle and contributing to the total thrust of the engine.

A pair of electrical leads 29 having contact surfaces flush with the external surface of the tape extend inwardly through the tape, the housing, and into the charge. An electrical igniting means 31, such as a fuse wire as shown or other electrical resistance, is embedded in the flame propagator and makes electrical contact with the ends of electrodes 29 to complete a conducting path therebetween. If desired the flame propagator 28 may be omitted and the igniting means 31 positioned in contact with charge 27 which may then be ignited directly.

Figure 3:
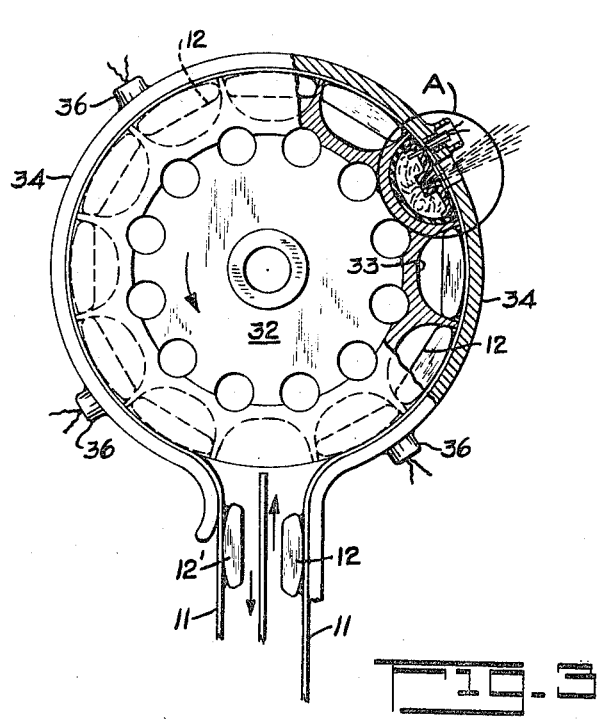
FIG. 3 is a plan view, partly in cross-section, of the tape-advancing and firing mechanism.
Figure 4:
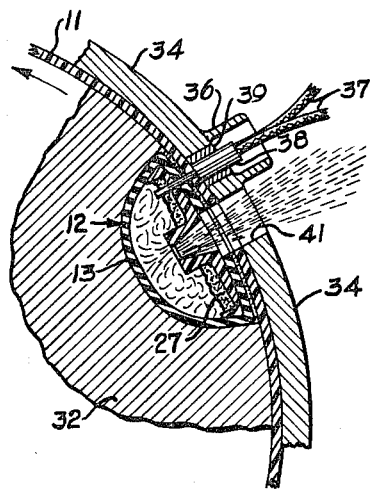
FIG. 4 is an enlarged view of the encircled portion A of FIG. 3.

FIG. 3 shows the advancing or transporting mechanism for the concatenated series of engines, and their firing positions, and FIG. 4 shows an enlarged view of one of the engines or capsules in process of firing. There is provided a drive wheel 32 rotatable in the direction shown by the arrow, having in its periphery a plurality of circumferentially-spaced cavities 33, each cavity being engageable wtih one of the engines 12 borne by the tape 11. A guide plate 34 surrounds the larger part of the periphery of the drive wheel 32, being radially spaced therefrom a sufficient distance to allow clearance for the passage of the tape thickness. As the drive wheel rotates in engagement with the concatenated series it draws tape from the supply magazine and feeds the engines serially to a selected firing position.

Cavities 33 are of suitable size and configuration to engage the engines with an easy fit and to pull the series along around the wheel, the spacing between cavities being equal to that between engines on the tape. The cavities extend radially inward to a greater depth than the thickness of the fresh engines, being domed to allow space for expansion of the elastomeric engine housings 13 during firing. In the embodiment shown the engines are generally square in outline, and the form of the cavities is therefore the female counterpart of a square cabochon. However, the engines may have any desired outline, such as oblong, oval, round, etc., and the cavities will therefore be formed to fit the engines used. Any desired number of cavities may be provided on the drive wheel, it being only necessary that their spacing should coincide with that of the engines in the particular concatenated series being used.

Drive wheel 32 may be powered by a stepper motor, for example, of known type (shown in FIG. 6) in discrete pulses which advance the engines serially to a selected one of a plurality of possible firing positions. In a large device of considerable inertia, it may be desirable to use a motor of different type which may be intermittently clutched to the drive wheel, instead of a stepper motor. As shown in FIG. 3 there are four such firing positions indicated by connectors 36, spaced ninety degrees apart, but the thrust device may be constructed with any desired number of firing positions at appropriate angular spacing. The angular increment of rotation of the motor at each pulse coincides with the azimuthal spacing of the cavities 33, so that each pulse advances the concatenated series by one engine, stopping at the selected firing position.

As shown in FIGS. 3 and 4, there is provided at each firing position a connector member 36 or other convenient means conveying electrical leads 37 for firing the charges. A pair of electrodes 38 are mounted in guide plate 34, insulated therefrom by insulating means 39, and connected electrically to leads 37. Electrodes 38 extend through the guideplate and are so positioned and spaced that when an engine stops in firing position their radially inner ends make contact with the contact surfaces of engine electrodes 29 to complete a firing circuit. The circuitry (not shown) which supplies leads 37 is of known type which energizes the electrodes in the selected position on command triggered by the collapse of the magnetic field in the coils of the stepper motor after each pulse signal. Thus the charge of an encapsulated engine cannot be fired while in motion with the wheel, since a circuit cannot be completed except at a firing position, and only the firing circuit at the selected position will be activated by a reverse inductive surge from the coils of the advancing mechanism.

Electrodes 38 are shown only by way of example and need not have the precise form depicted in the drawings. For instance, the electrodes may be leaf springs of electrically conducting material wiped by the engine electrodes, or they may be carbon brushes or other convenient means.

An engine in the process of firing is shown in FIG. 4. The propellant 27 is partially burned, the elastomeric housing 13 is fully expanded into its wheel cavity, and the combustion products are exhausting through the thrust nozzle, having previously blown plug 24 therefrom. Guide plate 34 is provided with an aperture 41 at each firing position coinciding with the position of exhaust nozzle 19. Since the actual duration of combustion for each charge is very short, the materials of the housing and the charge-carrier are not significantly affected during firing. After firing of an engine its elastomeric housing collapses to approximately its original dimensions, and the existing tape bearing fired or discarded engines 12' may be allowed to float free in a space environment. The discarded engines 12' may also occasionally include some unfired capsules, since if one burst of firing has taken place at the fourth position, for example, and the next burst should occur at the first position, a certain small number of unfired engines will already have passed the first position and will be borne out of the device by continued advance of the tape.

Figure 5:
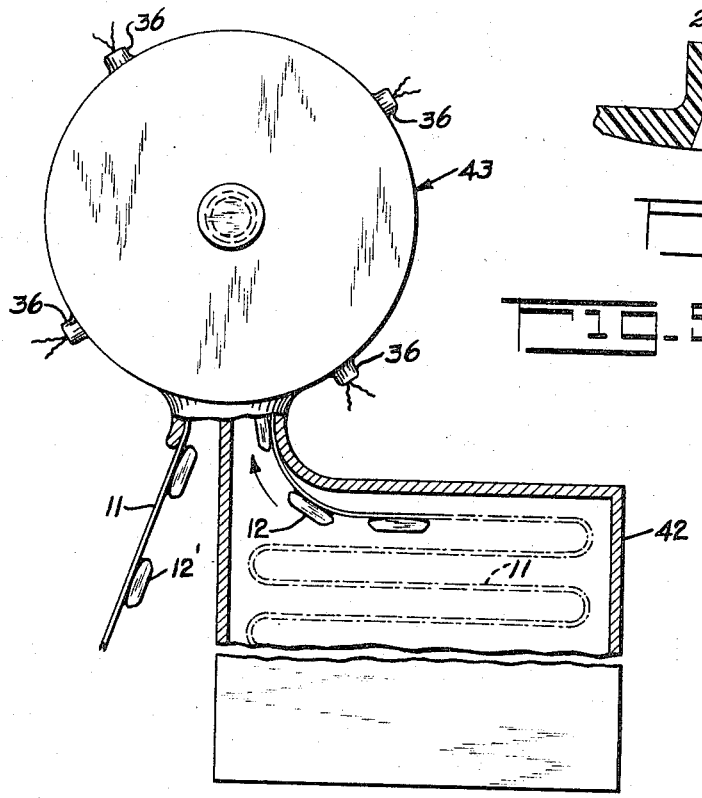
FIG. 5 is a plan view of the thrust device and magazine, partly in cross-section.
Figure 6:
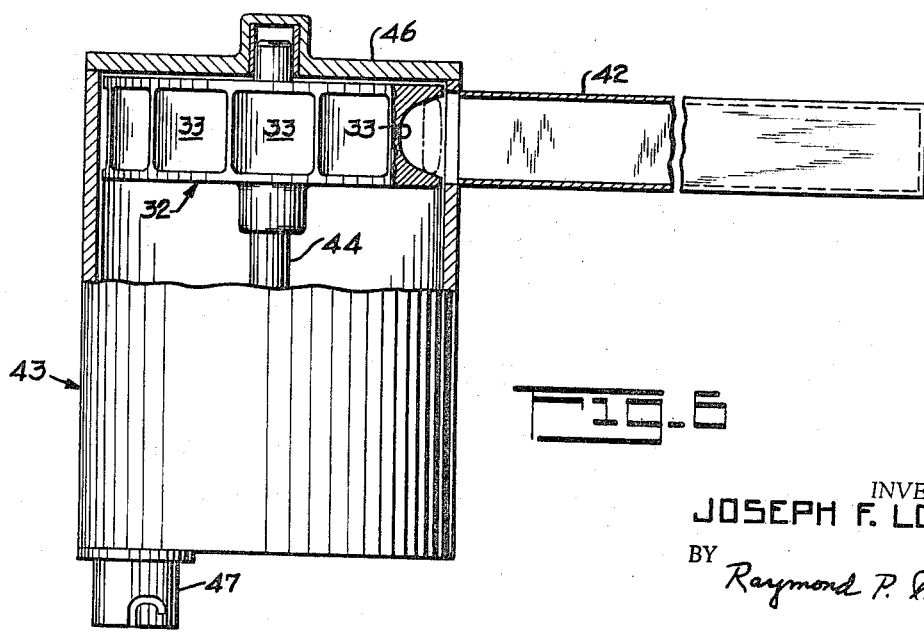
FIG. 6 is an elevation, partly in cross-section, of the device of FIG. 5.

FIGS. 5 and 6 show, respectively, a plan view and a side elevation of the intermittent thrust device with the tape magazine 42. Magazine 42 may be any convenient container for the concatenated rocket engines, and is shown as a rectangular box member adapted to hold a pleated tape of the desired length and communicating with the advancing mechanism. The magazine is loaded with a supply of tape pleated in such a manner as to run out freely, its free end being threaded into the advancing mechanism, and the magazine being so positioned as to allow the tape to run out in line with the advancing mechanism without binding.

A stepper motor 43 of conventional type is provided for driving wheel 32 in the selected angular increments. The output shaft 44 of the motor has mounted thereon and rotatable therewith the drive wheel 32, the free end of the shaft being journaled in a removable cover plate 46. A connector member 47 of conventional type extends from the stepper motor housing to provide for the introduction of the necessary electrical leads for the circuits to drive the motor and fire the engines. In the plan view of FIG. 5 the cover plate 46 is removed to show the communication of the magazine with the advancing mechanism, with the tape engaged thereby. It will be understood that the magazine need not have the particular rectangular shape shown, but may have other shapes or proportions, or may be curved or of any other form allowing the tape to run freely therefrom.

One or more thrust devices of the type described may be mounted on a space vehicle or missile for controlling the attitude thereof. For instance, if such a device is mounted with the axis of the thrust device coaxial with the longitudinal axis of the missile or vehicle, it will be apparent that by firing bursts from one or another firing position the longitudinal axis may be oriented in any desired direction. One or more thrust devices may also be positioned at other locations and oriented to discharge tangentially to the body of the missile or vehicle, to impart or control roll about the longitudinal axis. Such thrust devices may also be conveniently used to orient equipment borne by a space vehicle.

Figure 7:
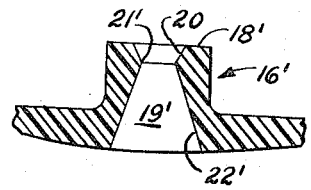
FIG. 7 is a fragmentary view showing a modified embodiment of one of the elements of FIG. 2.

Although the expanded dome of capsule housing 13 acts during firing with the short throat section 21 of the nozzle to form a converging portion, the converging-diverging effect can be produced wholly within the nozzle itself, as shown in FIG. 7. The tubular member 18' extending from the charge side of the carrier 16' is provided with a nozzle aperture 19' therethrough, comprising a converging portion 20, a throat 21', and a diverging portion 22'.

Although the invention has been described above in a preferred embodiment, it will be understood that various modifications may be made by those skilled in the art without departing from the principles of the invention. It is intended to cover all such modifications by the appended claims.

What is claimed is:
1. A concatenated series of individual reaction engines, comprising in combination a flexible tape member having a plurality of said engines longitudinally distributed thereon, each of said engines comprising a charge-carrier of generally plate-like form having one flat side and one side curved on a circular arc, a generally tubular member extending from said flat side substantially normal thereto and having a converging-diverging exhaust nozzle aperture therethrough having an orifice in said curved side, a charge of propellant material disposed on said flat side surrounding said tubular member, a flange propagating charge disposed on the surface of said propellant charge and having a lower ignition temperature than said propellant charge, electrical resistance means disposed in contact with said flame propagating charge, an expansible elastomeric housing encasing said carrier and said charges and bonded to said tape on the side adjacent to said curved side of said carrier, said tape and said housing being apertured generally coaxially with said nozzle orifice for discharge of gas therethrough during combustion, and a pair of electrodes having contact surfaces substantially flush with the surface of said tape and extending into said engine and being electrically connected to said resistance means.

2. A reaction engine for an intermittent thrust device, comprising in combination a charge-carrier of generally plate-like form having a generally tubular member extending from one side thereof, said tubular member having an exhaust nozzle aperture therethrough, a propellant charge disposed on one side of said carrier surrounding said tubular member, an expansible elastomeric housing encasing said carrier and said charge and having an aperture therethrough generally coaxial with said nozzle aperture on the side opposite said charge, and electrical igniting means comprising electrical resistance means in contact with said charge and a pair of electrodes connected electrically to said resistance and having contact surfaces external to said housing.

3. A concatenated series of individual reaction engines as in claim 2, comprising in combination a plurality of said engines and a flexible tape member, said engines being longitudinally distributed along one side of said tape member and having the engine sides containing said housing aperture bonded to said tape, said tape having apertures therethrough generally coaxial with said housing apertures, and said electrodes extending through said tape and having said contact surfaces substantially flush with the surface of said tape.

4. A reaction engine for an intermittent thrust device, comprising in combination a charge-carrier of generally plate-like form having a generally tubular member extending from one side thereof, said tubular member having an exhaust nozzle aperture therethrough, a propellant charge disposed on one side of said carrier surrounding said tubular member, a flame propagating charge disposed on the surface of said propellant charge and having a lower ignition temperature than said propellant charge, an expansible elastomeric housing encasing said carrier and both said charges and having an aperture therethrough generally coaxial with said nozzle aperture on the side opposite said charges, and electrical igniting means comprising electrical resistance means in contact with said flame propagating charge and a pair of electrodes connected electrically to said resistance and having contact surfaces external to said housing.

5. A concatenated series of individual reaction engines as in claim 4, comprising in combination a plurality of said engines and a flexible tape member, said engines being longitudinally distributed along one side of said tape member and having the engine sides containing said housing aperture bonded to said tape, said tape having apertures therethrough generally coaxial with said housing apertures, and said electrodes extending through said tape and having said contact surfaces substantially flush with the surface of said tape.

References Cited by the Examiner

UNITED STATES PATENTS

| | | | |
|---|---|---|---|
| 2,172,163 | 9/1939 | Glowka | 60—35.6 |
| 2,403,730 | 7/1946 | Mac Neille | 60—26.11 X |
| 3,017,746 | 1/1962 | Kiphart | 60—35.6 |
| 3,032,970 | 5/1962 | Fox | 60—35.6 X |
| 3,041,939 | 7/1962 | Dardick | 42—39.5 X |
| 3,043,105 | 7/1962 | Hagerty | 60—26.11 X |
| 3,046,842 | 7/1962 | Sergay | 42—39.5 X |
| 3,075,433 | 1/1963 | Stockholm | 89—13 |
| 3,103,784 | 9/1963 | Vetter et al. | 60—35.6 |
| 3,210,931 | 10/1965 | Elzufon et al. | 60—39.47 X |

CARLTON R. CROYLE, *Primary Examiner.*